US008832907B2

(12) United States Patent
De Jong et al.

(10) Patent No.: US 8,832,907 B2
(45) Date of Patent: Sep. 16, 2014

(54) FASTENING DEVICE

(75) Inventors: Michael De Jong, Binzen (DE); Jens Breitenfeld, Lörrach (DE); Thomas Podsadny, Salzhausen (DE)

(73) Assignee: A. Raymond et Cie, Grenoble (FR)

( * ) Notice: Subject to any disclaimer, the term of this patent is extended or adjusted under 35 U.S.C. 154(b) by 284 days.

(21) Appl. No.: 13/574,367

(22) PCT Filed: Jan. 25, 2011

(86) PCT No.: PCT/EP2011/050965
§ 371 (c)(1),
(2), (4) Date: Jul. 20, 2012

(87) PCT Pub. No.: WO2011/101207
PCT Pub. Date: Aug. 25, 2011

(65) Prior Publication Data
US 2012/0301218 A1 Nov. 29, 2012

(30) Foreign Application Priority Data

Feb. 18, 2010 (DE) .......................... 10 2010 008 458

(51) Int. Cl.
*F16B 21/07* (2006.01)
(52) U.S. Cl.
CPC ...................................... *F16B 21/07* (2013.01)
USPC .................... 24/293; 24/292; 24/294; 24/295
(58) Field of Classification Search
CPC .......... B60R 13/02; B60R 13/04; F16B 19/00
USPC ........................................... 24/289, 292–295
See application file for complete search history.

(56) References Cited

U.S. PATENT DOCUMENTS

| 2,707,013 | A | * | 4/1955 | Flora et al. ..................... 411/173 |
| 4,610,588 | A | * | 9/1986 | Van Buren et al. ............ 411/173 |
| 5,873,690 | A | * | 2/1999 | Danby et al. ..................... 411/55 |
| 6,095,734 | A | * | 8/2000 | Postadan et al. .............. 411/182 |
| 7,874,775 | B2 | * | 1/2011 | Hullmann et al. ............. 411/173 |
| 2003/0233738 | A1 | * | 12/2003 | Osterland et al. ................ 24/293 |
| 2005/0271492 | A1 | * | 12/2005 | Jackson et al. ................ 411/112 |
| 2006/0168773 | A1 | | 8/2006 | Smith et al. |
| 2006/0254032 | A1 | | 11/2006 | Gibbons et al. |
| 2006/0288545 | A1 | * | 12/2006 | Lubera et al. ................... 24/295 |

(Continued)

FOREIGN PATENT DOCUMENTS

| DE | 2309144 A1 | 8/1974 |
| DE | 202007001575 U1 | 4/2007 |
| DE | 202006019411 U1 | 9/2007 |
| DE | 102007005475 B4 | 9/2008 |

(Continued)

OTHER PUBLICATIONS

International Preliminary Report on Patentability mailed Mar. 15, 2012 in parent International Application No. PCT/EP2011/050965 (including the cover letter requesting International Examination and Annexes and the English translation thereof).

*Primary Examiner* — Robert J Sandy
*Assistant Examiner* — David Upchurch
(74) *Attorney, Agent, or Firm* — Faegre Baker Daniels LLP

(57) ABSTRACT

A fastening device having spring legs formed onto a cover plate, including support flanges, which are disposed in support flange recesses. The fastening element thereby has a very high pull-out force.

5 Claims, 4 Drawing Sheets

(56) References Cited

U.S. PATENT DOCUMENTS

2008/0084050 A1* 4/2008 Volkmann et al. ......... 280/728.2
2009/0169326 A1 7/2009 Hullmann et al.
2009/0242715 A1 10/2009 Kosidlo et al.

FOREIGN PATENT DOCUMENTS

| GB | 2162272 A | 1/1986 |
| JP | 7293521 A | 11/1995 |
| WO | WO2009/088573 A1 | 7/2009 |

* cited by examiner

FASTENING DEVICE

CROSS-REFERENCE TO RELATED APPLICATION

This application is a U.S. National Phase Patent Application based on International Application No. PCT/EP2011/050965 filed Jan. 25, 2011, the entire disclosure of which is hereby explicitly incorporated by reference herein.

BACKGROUND OF THE INVENTION

1. Field of the Invention

The present invention relates to a fastening device.

2. Description of the Related Art

One known fastening device is disclosed in DE 20 2006 019 411 U1. The prior fastening device for fastening an add-on part to a support part comprises a cover plate on which at least two spring legs are formed. Each spring leg has a first leg portion and a second leg portion, joined to each other via a bent-around portion. Each spring leg is also provided with two bracing flanges that are formed on one leg portion and confine the respective other leg portion. When the fastening device is arranged as intended, the bracing flanges engage behind the edge of a receiving recess provided on a support part, causing the fastening device to be reliably anchored to the support part.

SUMMARY OF THE INVENTION

The present invention provides a fastening device characterized by especially high pull-out forces.

By virtue of the fact that each bracing flange is disposed in a bracing flange recess provided in the leg portion that is confined by the bracing flanges formed on the other leg portion, the bracing flanges bear by their edges facing away from the cover plate against the edges of the bracing flange recesses directly opposite them, thus creating an especially high resistance to high pull-out forces.

In one form thereof, the present invention provides a fastening device for fastening an add-on part to a support part, including a cover plate on which are formed at least two spring legs, each of which has an outer leg portion and an inner leg portion joined to each other via a bent-around portion, each spring leg including two bracing flanges formed on one leg portion and confining the respective other leg portion, each bracing flange being disposed in a respective bracing flange recess that is provided in the outer leg portion and confines the bracing flanges formed on the inner leg portion, characterized in that the spring legs each include two blocking flanges pointing toward the other spring leg, the blocking flanges being provided at their free ends with tongue portions that are overlappingly engaged with the tongue portions of the blocking flange formed on the opposite spring leg.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
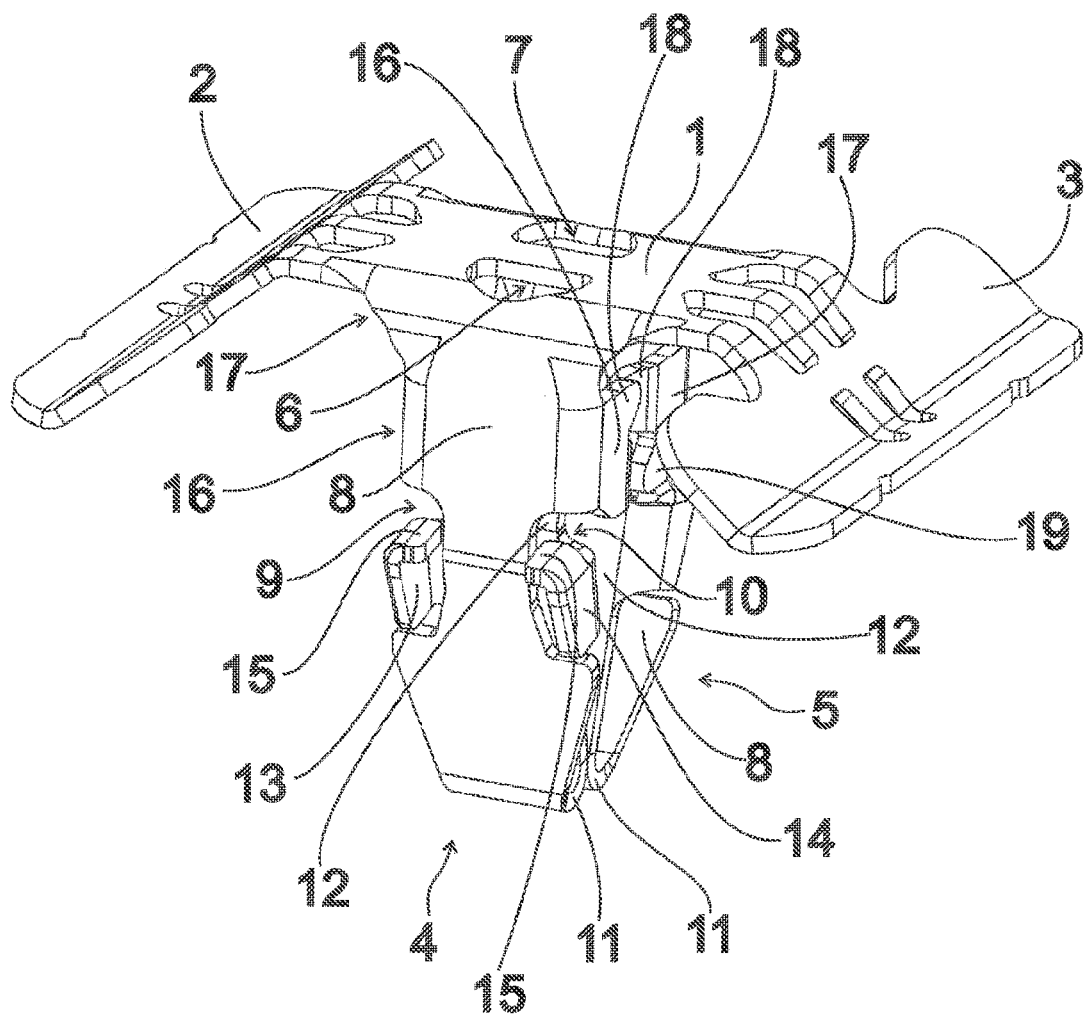
FIG. 1 is a perspective view of an exemplary embodiment of a fastening device according to the invention, comprising a cover plate on which two spring legs are formed.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of an exemplary embodiment of a fastening device according to the invention. The exemplary embodiment of FIG. 1, made from a metal strip in a stamping and bending process, comprises a cover plate 1 of substantially rectangular shape, on each narrow side of which is formed an angled bearing tongue 2, 3 intended to rest on an add-on part not shown in FIG. 1. Formed one on each long side of the cover plate 1 are spring legs 4, 5 extending away from the cover plate 1. Also provided in the cover plate 1, approximately in the middle of the long sides to which the spring legs 4, 5 are attached, are two access openings 6, 7, which allow access from the side of the cover plate 1 facing away from the spring legs 4, 5 to the interior space enclosed by the spring legs 4, 5.

Each spring leg 4, 5 has, as a first leg portion, an outer leg portion 8 joined to the cover plate 1. Formed in each outer leg portion 8 are outwardly open bracing flange recesses 9, 10, which are disposed approximately in the middle of the outer leg portions 8 in the longitudinal direction.

At the end of each outer leg portion 8 directed away from the cover plate 1 there is a respective bent-around portion 11 that joins the outer leg portion 8 to an inner leg portion 12 as a second leg portion. The inner leg portions 12 are disposed in the internal space between the outer leg portions 8 and extend from the bent-around portions 11 toward the cover plate 1. Formed on each inner leg portion 12 are two bracing flanges 13, 14, which extend away from the inner leg portions 12 through the bracing flange recesses 9, 10 out beyond the outer face of the respective outer leg portion 8. The bracing flanges 13, 14 are oriented at approximately right angles to the outer leg portions 8 and the inner leg portions 12 and are provided with outward-facing edge embossments to keep the mounting force relatively low.

Each bracing flange 13, 14 is provided, at its end directed away from bent-around portion 11, with an abutting portion 15 oriented at right angles to the bracing flange 13, 14 and approximately parallel to the cover plate 1, with the abutting portions 15 of bracing flanges 13, 14 formed on an inner leg portion 12 pointing toward each other.

When the fastening device according to the invention is arranged as intended, the abutting portions 15 engage behind a receiving opening in a support part not shown in FIG. 1, thereby fastening the add-on part to the support part.

Formed on the outer leg portions 8 between the cover plate 1 and the bracing flange recesses 9, 10, on the edge sides facing the bearing tongues 2, 3, are blocking flanges 16, 17, which extend toward the respective other outer leg portion 8 and are each configured with two tongue portions 18, 19 that are interdigitated with one another and overlap with the tongue portions 18, 19 of the opposite blocking flange 16, 17. This creates an end stop for the inward deflection of the outer leg portions 8.

Figure 2:
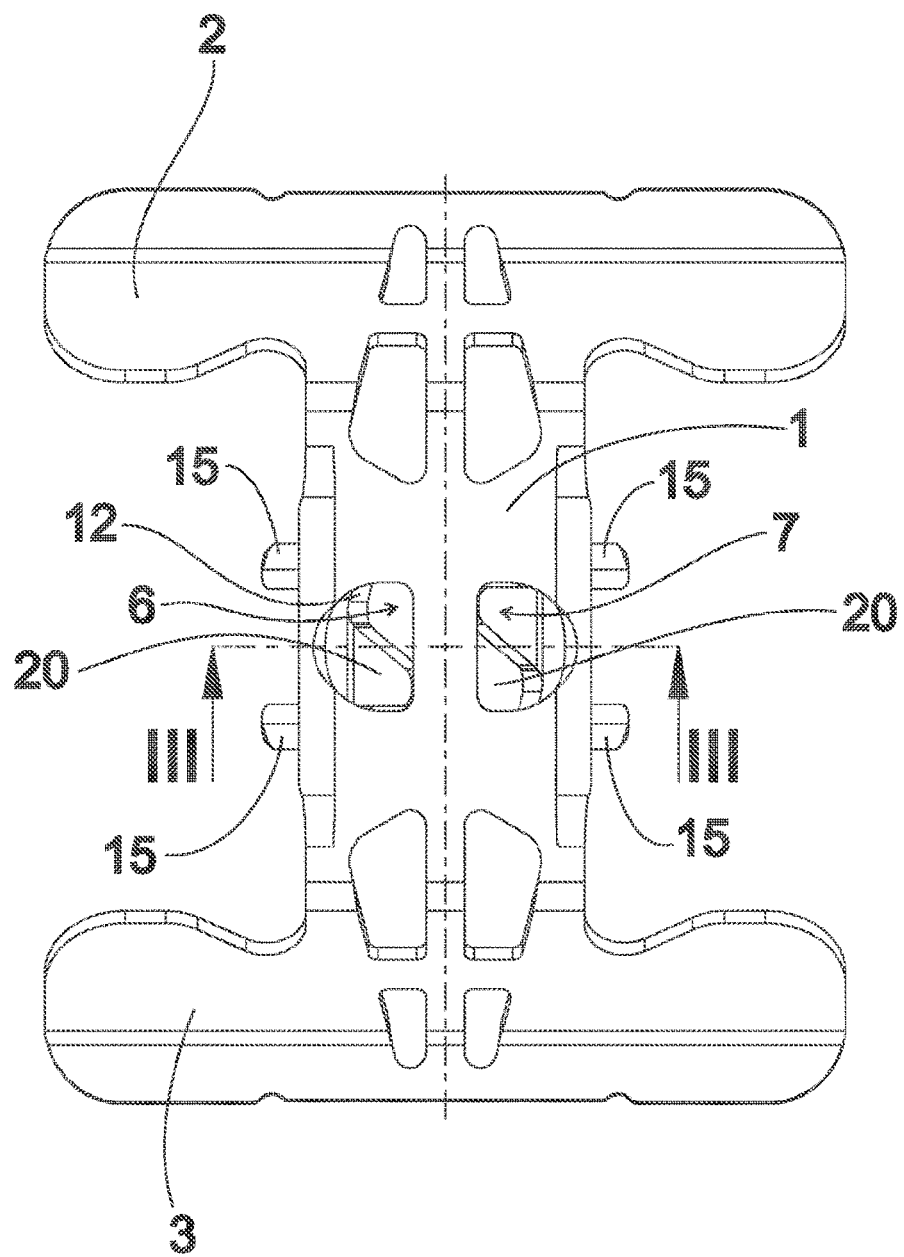
FIG. 2 shows the exemplary embodiment of FIG. 1 in a plan view of a cover plate.

FIG. 2 shows the exemplary embodiment of FIG. 1 in a plan view of the cover plate 1, with a view through the access openings 6, 7. As is evident from FIG. 2, formed on each of the inner leg portions 12 is an access tongue 20 that is angled in relation to its respective inner leg portion 12. By this means, the inner leg portions 12 can be moved closer together, away from the outer leg portions 8, by the insertion of two prongs of a demounting tool not shown in FIG. 2. In this way, the bracing flanges 13, 14, which in a relaxed arrangement of the spring legs 4, 5 protrude beyond the outer leg portions 8, can be moved into an arrangement where they are at least flush with the outer faces of the outer leg portions 8 in order to bring the fastening device according to the invention out of engagement with a support part, not shown in FIG. 2, to which the add-on part is to be mounted.

Figure 3:
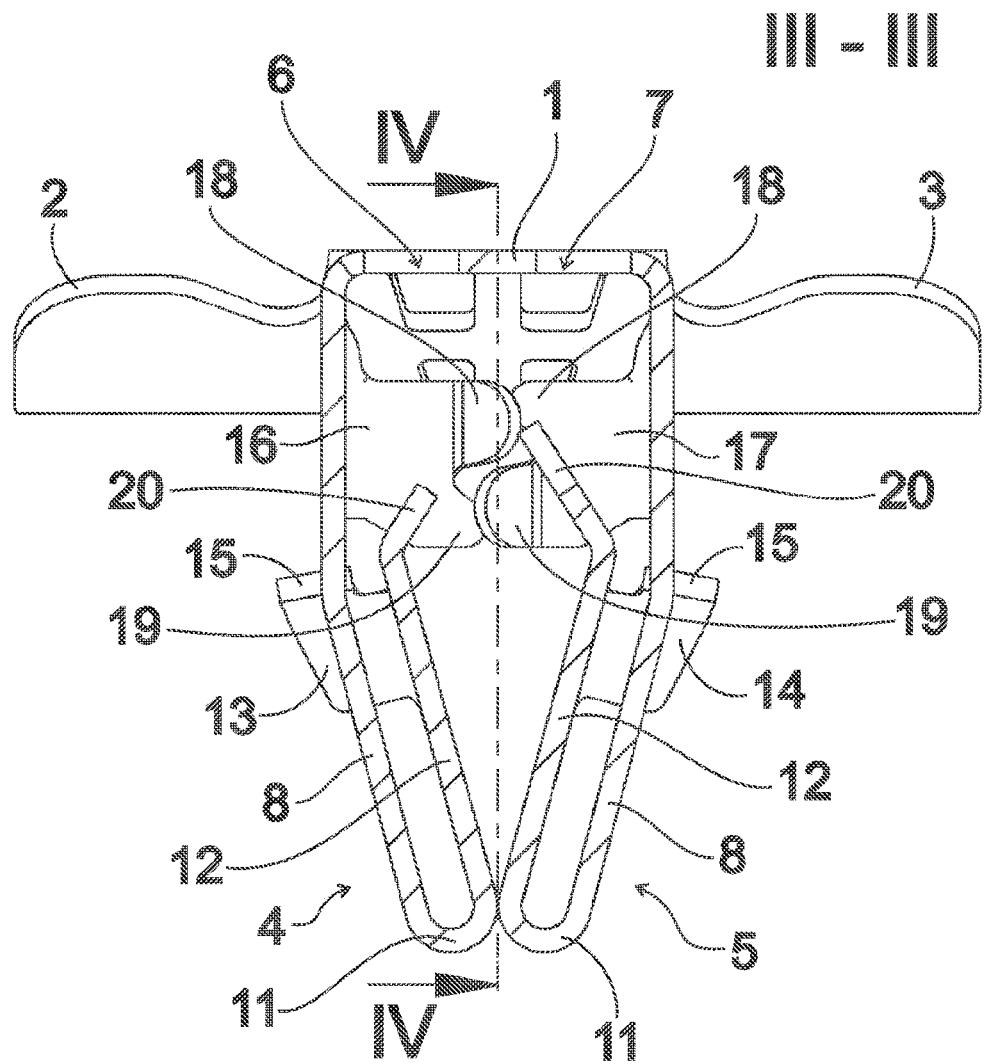
FIG. 3 shows the exemplary embodiment of FIG. 1 in a sectional view through the spring leg.

FIG. 3 shows the exemplary embodiment according to FIG. 1 in a longitudinal section through the spring legs 4, 5 along line III-III of FIG. 2. FIG. 3 furnishes a particularly clear view of the overlapping arrangement of the tongue portions 18, 19 that limits the inward-deflection path of the outer leg portions 8.

Figure 4:
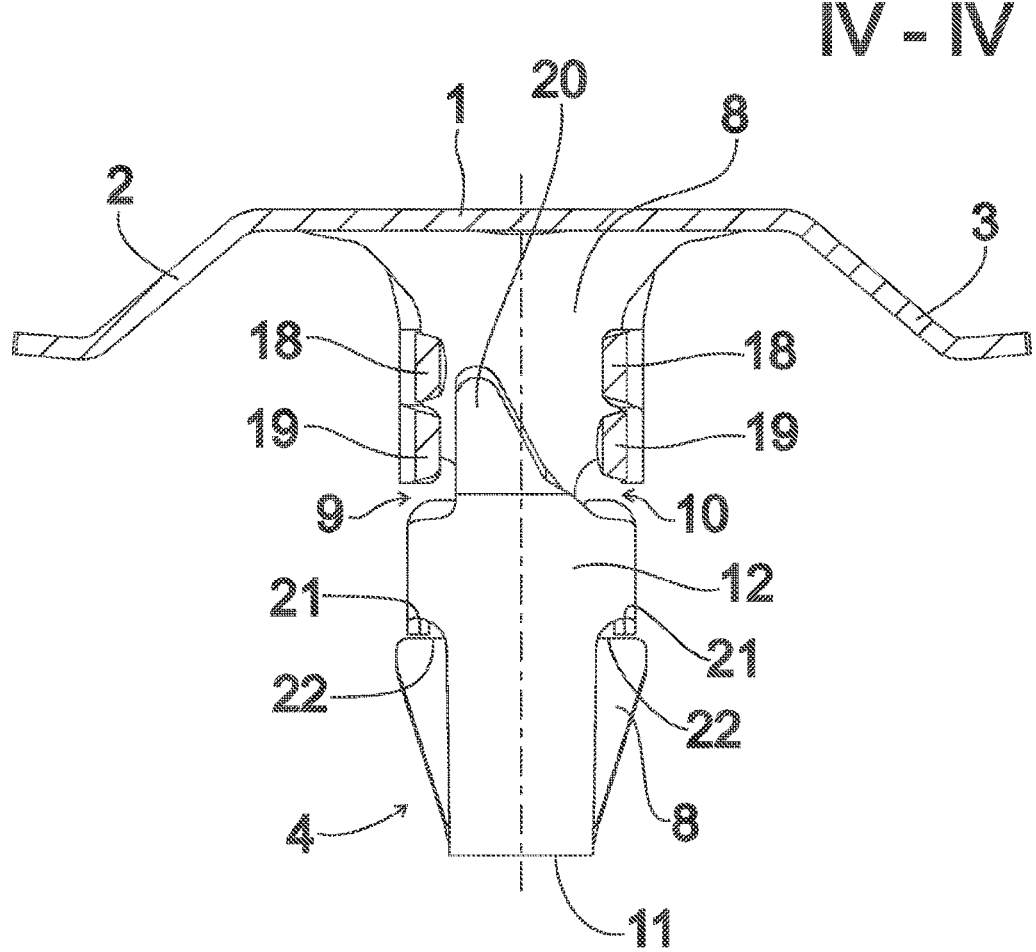
FIG. 4 shows the exemplary embodiment of FIG. 1 in a sectional view in which the section plane is rotated 90° compared to the sectional view of FIG. 3.

FIG. 4 shows the exemplary embodiment of FIG. 1 in a sectional view along line IV-IV of FIG. 3, with a section plane rotated 90° from the section plane of FIG. 3. It can be seen from FIG. 4 that the edges 21 of the bracing flanges 13, 14 facing away from the cover plate 1 confront the edges 33 of the bracing flange recesses 9, 10 facing toward the cover plate 1 at a very small distance that is preferably no greater than the material thickness of the metal sheet, such that the edges 21, 22 butt against each other in response to even a very small relative movement of the inner leg portions 12 of the cover plate 1, thus giving the fastening device according to the invention a very high resistance to high pull-out forces.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A fastening device for use in fastening an add-on part to a support part, said fastening device comprising:
a cover plate;
at least two spring legs extending from said cover plate, each said spring leg including an outer leg portion and an inner leg portion joined to each other via a bent-around portion, each said spring leg further comprising two bracing flanges formed on said inner leg portion and disposed in a respective bracing flange recess provided in said outer leg portion, said spring legs each further comprising two blocking flanges respectively pointing toward the other said spring leg, said blocking flanges including free ends having tongue portions overlappingly engaged with said tongue portions of said blocking flanges formed on an opposite said spring leg.

2. The fastening device of claim 1, wherein said bracing flanges include flange edges facing toward said bent-around portions and said bracing flange recesses include recess edges facing toward said cover plate and, in a relaxed arrangement of said spring legs, said flange edges and said recess edges are disposed at a distance apart from one another, said distance less than a material thickness of said bracing flanges.

3. The fastening device of claim 1, wherein said bracing flanges include flange edges facing toward said bent-around portions and said bracing flange recesses include recess edges facing toward said cover plate, said flange edges and said recess edges oriented perpendicular to each other.

4. The fastening device of claim 1, wherein said bracing flanges each include, on sides thereof facing toward said cover plate, a respective abutting portion that is oriented parallel to said cover plate.

5. The fastening device of claim 1, wherein said cover plate includes at least one access opening, and each spring leg includes a respective access tongue accessible with a tool via at least one of said access openings to release said spring legs from the support part.

* * * * *